(12) United States Patent
Soules et al.

(10) Patent No.: US 8,311,982 B2
(45) Date of Patent: Nov. 13, 2012

(54) STORING UPDATE DATA USING A PROCESSING PIPELINE

(75) Inventors: Craig A. N. Soules, San Francisco, CA (US); Kimberly Keeton, San Francisco, CA (US); Charles B. Morrey, III, Palo Alto, CA (US); Alistair Veitch, Mountain View, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 324 days.

(21) Appl. No.: 12/703,858

(22) Filed: Feb. 11, 2010

(65) Prior Publication Data

US 2011/0196880 A1 Aug. 11, 2011

(51) Int. Cl.
G06F 17/30 (2006.01)
(52) U.S. Cl. ......... 707/625; 707/620; 707/966; 707/971
(58) Field of Classification Search .................. 707/620, 707/966, 971, 625
See application file for complete search history.

(56) References Cited

U.S. PATENT DOCUMENTS

| 3,905,023 | A | | 9/1975 | Perpiglia | |
|---|---|---|---|---|---|
| 5,325,525 | A | | 6/1994 | Shan et al. | |
| 5,907,837 | A | * | 5/1999 | Ferrel et al. | 1/1 |
| 6,622,211 | B2 | * | 9/2003 | Henry et al. | 711/128 |
| 2007/0211280 | A1 | | 9/2007 | Bansal et al. | |
| 2008/0077629 | A1 | * | 3/2008 | Lorenz et al. | 707/203 |
| 2008/0177803 | A1 | * | 7/2008 | Fineberg et al. | 707/202 |
| 2009/0089334 | A1 | * | 4/2009 | Mohamed et al. | 707/200 |

FOREIGN PATENT DOCUMENTS

| KR | 1020050057834 | 1/2007 |
|---|---|---|
| WO | 2012005728 | 1/2012 |

OTHER PUBLICATIONS

Amazon Web Services, Amazon SimpleDB, http://aws.amazon.com/simpledb/ dated on or before Feb. 1, 2010 (7 pages).
Armbrust et al., SCADS: Scale-Independent Storage for Social Computing Applications, Jan. 2009 (7 pages).
Arpaci-Dusseau et al., Cluster I/O with River: Making the Fast Case Common, May 1999 (13 pages).
Chang et al., Bigtable: A Distributed Storage System for Structured Data, OSDI '06: 7th USENIX Symposium on Operating Systems Design and Implementation, 2006 (pp. 205-218).
DataSeries Technical Documentation, DataSeries: An Efficient, Flexible Data Format for Structured Serial Data, Mar. 16, 2008 (18 pages).
Dean et al., MapReduce: Simplified Data Processing on Large Clusters, 2004 (13 pages).
Ghemawat et al., The Google File System, SOSP '03, Oct. 19-22, 2003 (15 pages).

(Continued)

Primary Examiner — William Spieler (57) ABSTRACT

A system has a processing pipeline with a plurality of processing stages, where each of the processing stages has one or plural processors, and where the processing stages are individually and independently scalable. A first of the processing stages of the processing pipeline provides a received date update into an update data structure, where the update data structure is accessible to process a query received by the system. One or more additional of the processing stages transforms the update data structure to allow for merging of the transformed update data structure into a database, where the transformed update data structure is accessible to process the query. Content of the transformed update data structure is stored into the database.

20 Claims, 5 Drawing Sheets

OTHER PUBLICATIONS

Welcome to Apache Hadoop, http://hadoop.apache,org/, Jul. 2009 (2 pages).
DeCandia et al. Dynamo: Amazon's Highly Available Key-Value Store, SOSP 2007 (16 pages).
Hildenbrand, S., Performance Tradeoffs in Write-Optimized Databases, Systems Group, Department of Computer Science, ETH Zurich, Mar.-Aug. 2008 (75 pages).
Anderson et al., DataSeries: An Efficient, Flexible Data Format Format for Structured Serial Data, HPL-2009-323, Sep. 2009 (7 pages).
Keeton et al., LazyBase: Freshness vs. Performance in Information Management, Oct. 2009 (5 pages).
Lester et al., In-Place versus Re-Build versus Re-Merge: Index Maintenance Strategies for Text Retrieval Systems, 2004 (8 pages).
Leung et al., Spyglass: Fast, Scalable Metadata Search for Large-Scale Storage Systems, 7th USENIX Conference on File and Storage Technologies, 2009 (pp. 153-166).
Platform LSF 7, New Features for HPC Administrators and Users, 2009 (2 pages).
Lucene, http://lucene,apache.org/, Nov. 26, 2009 (6 pages).
Plattner, H., A Common Database Approach for OLTP and OLAP Using an In-Memory Column Database, SIGMOD '09, Jun. 29-Jul. 2, 2009 (7 pages).
Schaffner et al., A Hybrid Row-Column OLTP Database Architecture for Operational Reporting, 2008 (14 pages).
Shah et al., Flux: An Adaptive Partitioning Operator for Continuous Query Systems, Report No. UCB/CSD-2-1205, Oct. 2002 (16 pages).
Soules et al., SCAN-Lite: Enterprise-Wide Analysis on the Cheap, EuroSys 2009, Apr. 1-3, 2009 (14 pages).
Thain et al., Distributed Computing in Practice: The Condor Experience, 2005 (37 pages).
Zhou, et al., Utopia: A Load Sharing Facility for Large, Heterogeneous Distributed Computer Systems, 1993 (36 pages).
Severance et al., Differential Files: Their Application to the Maintenance of Large Databases, ACM Transactions on Database Systems, vol. 1, No. 3, Sep. 1976 (pp. 256-267).
Buttcher et al., Indexing Time vs. Query Time Trade-offs in Dynamic Information Retrieval Systems, CIKM 2005, Oct. 31-Nov. 5, 2005, ACM 1-59593-140-6/05/0010 (2 pages).
Leinberger, W., et al., Job Scheduling in the presence of Multiple Resource Requirements, 1999 ACM/IEEE Conference on Supercomputing, IEEE, Nov. 13-18, 1999 (16 pages).

* cited by examiner

STORING UPDATE DATA USING A PROCESSING PIPELINE

BACKGROUND

Data mining, analysis and search often make up a substantial portion of enterprise application workloads. Examples of data that are the subject of data mining, analysis, and search include purchase transactions, news updates, web search results, email notifications, hardware or software monitoring observations, and so forth.

Such data is collected into datasets. However, as the sizes of datasets increase, the ability to efficiently access the content of such datasets has become more challenging.

BRIEF DESCRIPTION OF THE DRAWINGS

Some embodiments of the invention are described with respect to the following figures.

DETAILED DESCRIPTION

An organization can have a relatively large amount of data that users or applications within the organization may request for purposes of data mining, analysis, search, and so forth. The data can span many different departments or divisions within the organization, and can be stored on various different types of devices, including desktop computers, notebook computers, email servers, web servers, file servers, and so forth. Examples of requests for data include electronic discovery requests, document requests by employees, requests made for information technology (IT) management operations, or other types of requests.

To improve the ability to locate the content of various data stored across an organization, metadata associated with such data from many information sources can be uploaded to a server system (or multiple server systems) to allow users to submit queries against the server system(s) to locate data based on the metadata. Examples of metadata that can be uploaded to the server system(s) include metadata computed based on content of the data, including hashes (produced by applying hash functions on data), term vectors (containing terms in the data), fingerprints, feature vectors. Other examples of metadata include filesystem metadata, such as file owners or creators, file size and security attributes, or information associated with usage of the data, such as access frequency statistics.

In the ensuing discussion, reference is made to one server system for storing metadata (or other types of data). In alternative implementations, it is noted that there can be multiple server systems. Although reference is made to storing metadata in the server system, it is noted that embodiments of the invention can also be applied for implementations in which other types of data are stored in the server system. As used here, the term "data" can refer to any type of data, including actual data, metadata, or other types of information.

In a large organization, the server system is designed to support data updates from multiple sources across the organization (e.g., up to hundreds of thousands or even millions for a large organization). A "data update" refers to a creation of data, modification of data, and/or deletion of data. Because there can be a relatively large amount of data updates to upload to the server system, it may take a relatively long period of time before the data updates are available for access by queries submitted to the server system using conventional techniques.

Different applications have different data freshness specifications and different query performance goals. "Data freshness" refers to how up-to-date data should be for a response to a query. In some applications, a user may want a relatively quick response to a query, but the user may be willing to accept results that are out-of-date (e.g., out-of-date by a certain time period, such as 12 hours, one day, etc.). On the other hand, a virus scanning application may want an up-to-date response about content of various machines within the organization, but the virus scanning application may be willing to accept a slower response time to a query.

In accordance with some embodiments, client devices that are able to submit queries to the server system are able to specify their corresponding data freshness constraints and query performance goals. Based on the specified data freshness constraints and query performance goals, the server system processes a query accordingly. If data freshness is indicated to be important to a client device, then the server system will respond to a query from the client device by providing response data that is more up-to-date. However, this may come at the expense of a longer query processing time. On the other hand, if the client device specifies a lower level of data freshness but a higher query performance goal, then the server system will process a query by providing response data that may not be up-to-date (the response data may be up-to-date to within one day of the present time, for example), but the response data will be provided to the requesting client device in a shorter amount of time.

In accordance with some embodiments, the server system that stores data subject to query by various client devices includes a processing pipeline that has multiple processing stages to perform different types of processing with respect to incoming data (data updates) that is to be stored in the server system.

Figure 1:
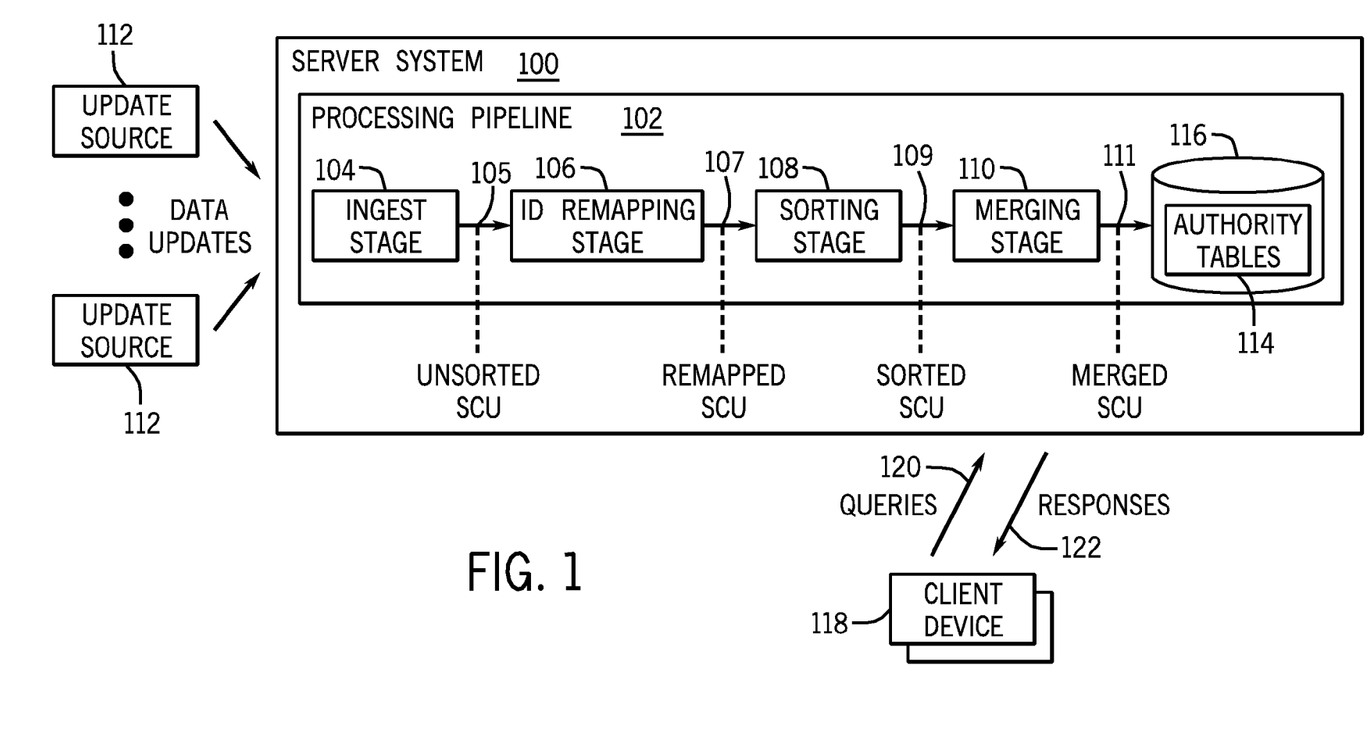
FIG. 1 is a block diagram of a system having a processing pipeline according to some embodiments.

A general representation of a server system 100 that includes a processing pipeline according to some embodiments is depicted in FIG. 1. As depicted, the server system 100 includes a processing pipeline 102 that has an ingest stage 104, an ID (identifier) remapping stage 106, a sorting stage 108, and a merging stage 110. Data updates from various update sources 112 are provided to the server system 100 for processing by the processing pipeline 102. Examples of the update sources 112 include various machines that can store data within an organization, where the machines can include desktop computers, notebook computers, personal digital assistants (PDAs), various types of servers (e.g., file servers, email servers, etc.), or other types of devices. Although specific stages of the processing pipeline 102 are depicted in FIG. 1, it is noted that in different embodiments alternative stages or additional stages can be provided in the processing pipeline 102.

A data update that is sent to the server system 100 can include the metadata associated with the data stored on the update sources 112, as discussed above. Alternatively, instead of metadata, actual data can be stored in the server system 100, such as various types of files, emails, video objects, audio objects, and so forth.

The processing pipeline 102 provides the ability to trade data freshness for query performance in the presence of ongoing data updates. The processing pipeline 102 achieves these goals through the use of a pipelined architecture that decreases data freshness but isolates query performance from ongoing updates. By being able to selectively access different ones of these stages depending upon the data freshness desired by the requesting client device, the processing pipeline 102 is able to trade some query performance for increased data freshness, or vice versa.

In some embodiments, multiple updates from one or more of the update sources 112 can be batched together into a batch that is to be atomically and consistently applied to an "authority table" 114 stored in a data store 116 of the server system 100. An authority table 114 refers to a repository of the data that is to be stored by the server system 100, where the authority table 114 is usually the table that is searched in response to a query for data. The data store 116 can store multiple authority tables 114, in some embodiments. More generally, the authority tables 114 are referred to as data tables, which are contained in a database. A "database" refers to a collection of data tables.

Another type of table that can be maintained by the server system 100 is an update table, which contains data that is to be applied to an authority table 114 after processing through the processing pipeline 102. The various processing stages (104, 106, 108, 110) are configured to process update tables.

The ingestion of updates by the server system 100 should leave the server system 100 in a consistent state, which means that all of the underlying tables affected by the updates will be consistent with one another.

Multiple updates can be batched into a single self-consistent update (SCU) (more generally referred to as a "batch of updates"). The SCU is applied to tables stored in the server system 100 as a single atomic unit, and is not considered durable until all the individual updates in the batch (SCU) are written to stable (persistent) storage. Atomic application of data updates of an SCU to the stable storage means that all data updates of the SCU are applied or none are applied. Data updates in any one SCU are isolated from data updates in another SCU.

The ingest stage 104 of the processing pipeline 102 batches (collects) incoming updates from update sources 112 into one or more unsorted SCUs (or other types of data structures). In some embodiments, an unsorted SCU is durable, which means that the updates of the SCU are not lost upon some error condition or power failure of the server system 100. Moreover, by storing the data updates in the server system 100, the data updates are converted from being client-centric to server-centric.

As shown in FIG. 1, the output (105) of the ingest stage 104 is an unsorted SCU (or multiple unsorted SCUs). Each SCU includes one or more update tables containing update data. The unsorted SCU(s) are provided to the ID remapping stage 106, which transforms initial (temporary) ID(s) of SCU(s) into global ID(s). Effectively, the ID remapping stage 106 maps an ID in a first space to an ID in a second space, which in some embodiments is a global space to provide a single, searchable ID space. The initial (temporary) IDs used by the ingest stage 104 are assigned to each unique entity (for example, file names) as those entities are processed. ID's are used in place of relatively large pieces of incoming data such as file path names, which improves query and processing times and reduces usage of storage space. In addition, in embodiments where the ingest stage 104 is implemented with multiple processors, temporary IDs generated by each of the processors can be remapped to the global ID space. In this way, the processors of the ingest stage 104 do not have to coordinate with each other to ensure generation of unique IDs, such that greater parallelism can be achieved. Note that as used here, a "processor" can refer to an individual central processing unit (CPU) or to a computer node.

The output (107) of the ID remapping stage 106 includes one or more remapped SCUs (within each remapped SCU, an initial ID has been remapped to a global ID). The remapped SCU is provided to the sorting stage 108, which sorts one or more update tables in the remapped SCU by one or more keys to create a sorted SCU that contains one or more searchable indexes.

The output (109) of the sorting stage 108 is a sorted SCU (or multiple sorted SCUs), which is (are) provided to the merging stage 110. The merging stage 110 combines individual sorted SCUs into a single set of authority tables 114 to further improve query performance. The output of the merging stage 110 is represented as 111.

In accordance with some embodiments, the various processing stages 104, 106, 108, and 110 of the processing pipeline 102 are individually and independently scalable. Each stage of the processing pipeline 102 can be implemented with a corresponding set of one or more processors, where a "processor" can refer to an individual central processing unit (CPU) or to a computer node. Parallelism in each stage can be enhanced by providing more processors. In this manner, the performance of each of the stages can be independently tuned by implementing each of the stages with corresponding infrastructure. Note that in addition to implementing parallelism in each stage, each stage can also implement pipelining to perform corresponding processing operations.

As further depicted in FIG. 1, one or more client devices 118 can submit queries 120 to the server system 100. The server system 100 responds to the queries 120 with responses 122 that are provided back to the one or more client devices 118. Note that the client devices 118 may or may not have members in common with the update sources 112.

To process a query from a client device 118, the server system 100 can access just the authority tables 114, or alternatively, the server system 100 has the option of selectively accessing one or more of the processing stages 104, 106, 108, and 110 in the processing pipeline 102. The time for processing a query is optimal when just the authority tables 114 have to be consulted to process a query. However, accessing just the authority tables 114 means that the response data retrieved may not be up-to-date (since there may be various data updates in the different stages of the processing pipeline 102).

To obtain fresher (more up-to-date data), the stages of the processing pipeline 102 can be accessed. However, having to access any of the processing stages in the processing pipeline 102 would increase the amount of time to process the query, with the amount of time increasing depending upon which of the processing stages are to be accessed. Accessing a later stage of the processing pipeline 102 involves less query processing time than accessing an earlier stage of the processing pipeline 102. For example, accessing content of sorted and merged update tables provided by the sorting and merging stages 108 and 110 takes less time than accessing the unsorted update tables maintained by the ingest stage 104 or the ID remapping stage 106. Moreover, accessing the ingest stage 104 may involve the additional operation of mapping a global ID to an initial ID that is kept by the ingest stage 104.

Whether or not to access the processing stages of the processing pipeline 102 for processing a query depends upon specifications of a data freshness constraint and query performance goal set by a client device 118. Increased data freshness means that the server system 100 should access earlier stages of the processing pipeline 102. A higher performance goal means that the server system 100 should avoid accessing earlier stages of the processing pipeline 102 to retrieve response data for a query.

As noted above, in some embodiments, the server system 100 logically organizes data into authority tables and update tables each with an arbitrary number of named columns. Each table is stored using a primary view, which contains all of the data columns and is sorted on a key: an ordered subset of the columns in the table. For example, a table might contain three columns (A, B, C) and its primary view key can be (A, B), meaning the table is sorted first by A and then by B for equal values of A. Tables may also have any number of materialized secondary views that contain a subset of the columns in the table and are sorted on a different key.

SCUs are maintained as update tables of additions, modifications, and deletions, which are applied to the named authority tables. An update table has the same schema as the associated authority table, as well as additional columns to indicate the type of operation and a timestamp.

Figure 2:
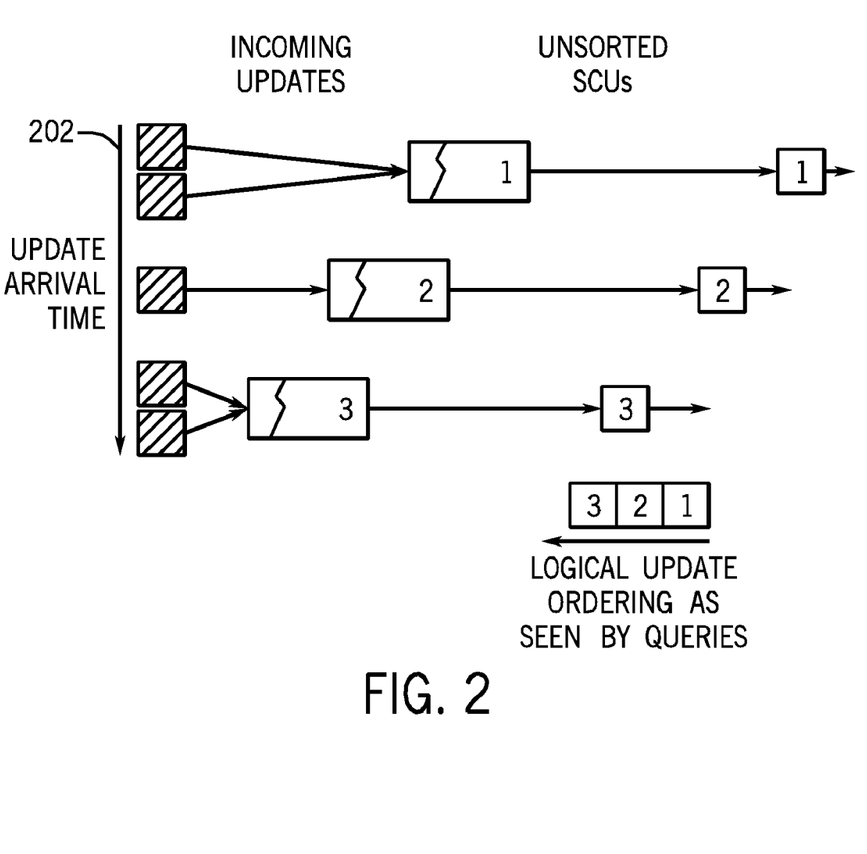
FIG. 2 is a schematic diagram illustrating processing of data updates received over time, in accordance with an embodiment.

FIG. 2 shows the arrival of updates over time (represented by downwardly pointing arrow 202) from one or more update sources 112. The updates are represented by the shaded boxes on the left side of FIG. 2. The lower boxes represent updates that have arrived later in time than the upper boxes in FIG. 2.

The updates are combined to form an SCU. Updates are collected together until either a sufficient amount of time has passed (based on a timeout threshold) or a sufficient amount of data has been collected (based on some predefined size watermark). After either the timeout has occurred or the size watermark has been reached, new updates that are received are directed to the next SCU. Three unsorted SCUs are depicted in FIG. 2, with the unsorted SCUs labeled "1", "2", and "3". FIG. 2 also illustrates the logical update ordering of the unsorted SCUs 1, 2, and 3 as seen by queries. As shown in FIG. 2, SCUs are created in client arrival order, and exposed to queries in this order, although some embodiments may prefer to process and expose SCU's in other orders. Freshness constraints can be satisfied by examining the SCUs that correspond to the desired point in time. Identifying SCUs for satisfying freshness constraints involves understanding the time to generate the SCU, time to complete its processing throughout each stage of the processing pipeline 102 (pipeline processing latency), and the time to execute the query.

The first component (time to generate the SCU) depends on the arrival patterns of client updates, as well as the watermarks and timeout specifications used to accumulate the SCU. Pipeline processing latency can be determined as a function of the steady-state throughput of each stage. Depending on when a query is issued and what its freshness specifications are, the system can choose the appropriate representation of the SCU (sorted or unsorted) to consult in satisfying the query. SCUs are applied as a single atomic unit, which leaves the database in a consistent state. The SCUs are not considered durable until all of the individual updates in the batch are written to stable storage. The use of SCUs also permits isolation between updates within a pipeline stage, and between queries and update ingestion. The unit of isolation is the SCU, which may contain updates from multiple data sources 112. If the goal is to achieve per data source isolation, then SCUs can be formed with updates from a single data source only.

As noted above, the SCUs are applied in a time order. For example, each SCU can be associated with a timestamp indicating when the SCU was created. The timestamps of the SCUs can be employed to specify the order of applying the SCUs in the processing pipeline 102. In other implementations, other mechanisms for ordering the SCUs can be used. Ordering SCUs is easy in implementations where the ingest stage is implemented with just one processor (e.g., one computer node), such that the SCUs are serially applied. However, if the ingest stage 104 is implemented with multiple processors (e.g., multiple computer nodes), then ordering of SCUs becomes more complex. In provisioning the ingest stage, if enhanced parallelism is desired, then a more complex mechanism would have to be provided to assure proper ordering of the SCUs. On the other hand, reduced parallelism would involve less complex ordering mechanisms, but would result in an ingest stage having reduced performance.

Figure 3:
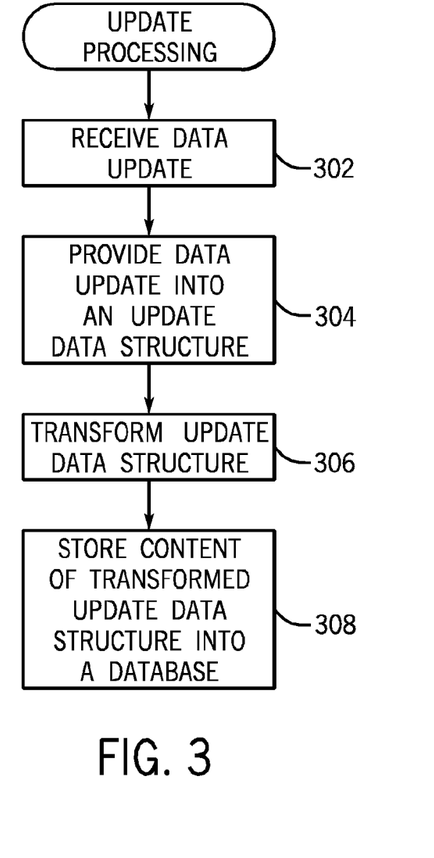
FIGS. 3 and 4 are flow diagrams of processes of performing data update processing, in accordance with some embodiments.

FIG. 3 depicts a generalized update processing according to some embodiments. A data update is received (at 302) by the processing pipeline 102 of the system 100. The processing pipeline 102 provides (at 304) the data update into an update data structure, such as the SCU discussed above. The update data structure is then transformed (at 306) by one or more of the processing stages of the processing pipeline 102 into a form that allows for merging of the transformed update data structure into a database. The transforming includes one or more of: ID remapping, sorting, and merging. Next, the content of the transformed update data structure is stored (at 308) into a database (e.g., the authority tables 114).

Figure 4:
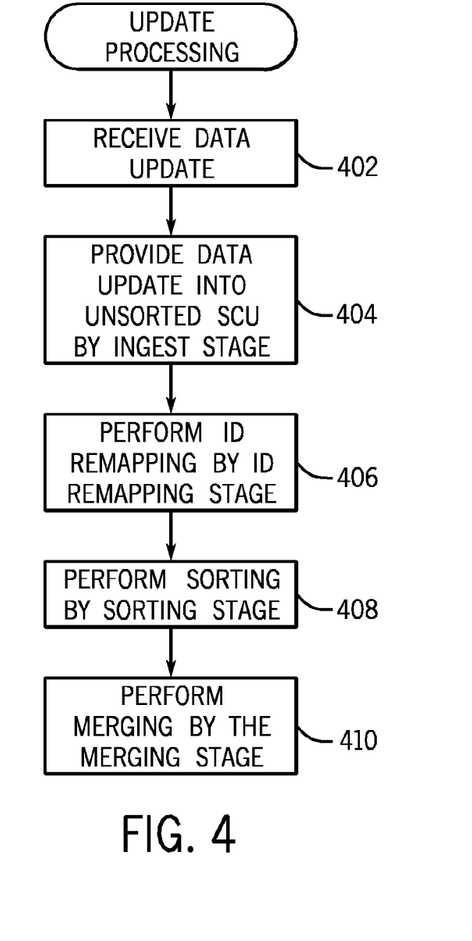

FIG. 4 illustrates update processing performed by the processing pipeline 102 in accordance with a further, more detailed embodiment. A data update is received (at 402) by the processing pipeline 102. The data update is provided (at 404) into an unsorted SCU by the ingest stage 104.

A goal of the ingest stage 104 according to some implementations is to get data from client devices into a form so that the data is both (1) durable and (2) available for query, albeit with potentially high query cost. In the ingest stage 104, updates are read from client devices and written as rows into an unsorted primary view for the corresponding update table kept by the ingest stage 104. Rows of the primary view are assigned timestamps based on their ingestion time (used to resolve overwrites) and a flag indicating row deletion is set or unset (the flag is set if the key specified in this row should be removed from the database). ID keys in the updates are assigned initial IDs and the mapping from key to temporary ID is stored with the unsorted data. The combination of unsorted data and initial ID mappings results in an unsorted SCU that can be passed to the next stage (ID-remapping stage 106) of the pipeline 102.

Upon receiving the unsorted SCU from the ingest stage 102, the ID remapping stage 106 performs (at 406) ID remapping by converting initial IDs to global IDs. To convert SCUs from using initial IDs to global IDs, a two-phase operation can be performed: ID-assignment and update-rewrite, which can be both pipelined and parallelized. In ID-assignment, the ID remapping stage 106 does a lookup on the keys in the SCU to identify existing keys and then assigns new global IDs to any unknown keys, generating an initial ID to global ID mapping for this update. A benefit of first checking for existing keys before assigning global IDs is that the relatively small size of the update dictates the size of the lookup, which enhances the likelihood of data processed by the ingest stage 104 can fit into physical memory. Thus, the lookup does not grow with the size of the system 100 and, over time, will not dominate the ingest time. Because the ID-assignment phase does a lookup on a global key-space, this phase can be parallelized through the use of key-space partitioning.

The second phase, update-rewrite, involves rewriting the SCU with the correct global IDs. Because the mapping from initial ID to global ID is unique to the SCU being converted, any number of rewrites can be performed in parallel.

Next, sorting of the remapped SCU is performed (at 408) by the sorting stage 108. The SCU's unsorted update tables are sorted by the appropriate key or keys. Update tables may have to be sorted in multiple ways, to match the primary and secondary views of the corresponding authority tables. Sorting is performed by reading the update table data to be sorted into memory and then looping through each view for that update table, sorting the data by the view's key. The resulting sorted data sets form the sorted SCU. The sorting stage 108 can be parallelized to nearly any degree. Because sorted data is merged in the next stage, sorting can take even a single table, break it into multiple chunks, and sort each chunk in parallel, resulting in multiple sorted output files.

Next, merging is performed (at 410) by the merging stage 110. A sorted SCU can be merged by the merging stage 110 into an authority table 114. Because the performance of queries against sorted data is dictated primarily by the number of sorted update tables to search through, merging update tables together into fewer tables improves the query performance. Even merging two sorted update tables into a single sorted update table will improve query performance. In some embodiments, tree-based parallelism is implemented in the merging stage 110. Rather than each sorted table being directly merged with the corresponding authority table, sets of update tables can be first merged together, and non-overlapping sets can be merged in parallel, forming a tree of updates working toward the "root," which merges large sorted update tables with the authority table. The merge with the authority table, like ID-assignment, is a global operation, and can be parallelized through the use of key-space partitioning, in which the authority table is maintained as several table portions partitioned by key-space, allowing merges of separate key-spaces to proceed in parallel. Finally, merges to each of the individual authority views can also be executed in parallel.

In some embodiments, merging an update table into an authority table can be accomplished by performing a merge-join, in which the entire authority table is updated. However, if the authority table is large, then this operation can be relatively expensive, since potentially the entire authority table may have to be updated. A benefit of performing a merge using this technique is that the data in the authority table remains stored in sequential order on the underlying storage medium.

In alternative embodiments, an authority table can be divided into multiple extents, where each extent has a set of rows of data. To merge an update table into the authority table, the merging stage 110 first identifies the extents (usually some subset less than all of the extents of authority table) that will be affected by the merge. The merge would then only rewrite the identified extents (thus the cost of the merge operation is based on the size of the update table and the distribution of keys in both the update table and the authority table, rather than the size of the authority table). The new extents (containing the merged old data and new data) can be added to the end of the authority table, for example. An index to the authority table can be updated to point to the new extents.

An issue of using the latter merge technique is that the extents in the authority table may no longer be in sequential order on the underlying storage medium. However, random access to the authority table does not suffer since an index can be used to quickly access the content of the authority table. Sequential access performance may potentially suffer, since if the authority table is stored on disk-based storage media, disk seeks may be involved in accessing logically consecutive data. To address this issue, an authority table rewrite can be performed to place the extents of the authority table in sequential order. The rewrite can be performed in the background, such as by another stage in the processing pipeline 102.

With respect to total system scalability, each of the processing stages of the processing pipeline 102 exhibit different scaling properties as described above. Ingest, sorting, and the update-rewrite phase of ID remapping are all linearly parallelizable with the number of processors used to implement the corresponding stage. Merging is log n parallelizable, where n is the fan-out of the merge tree. Finally, the ID-assignment phase of ID remapping and merging are both m-way parallelizable, where m is the number of partitions created in the key-space. The authority table merge is t-way parallelizable with t being the number of distinct views. The authority table merge is also m-way parallelizable.

Figure 5:
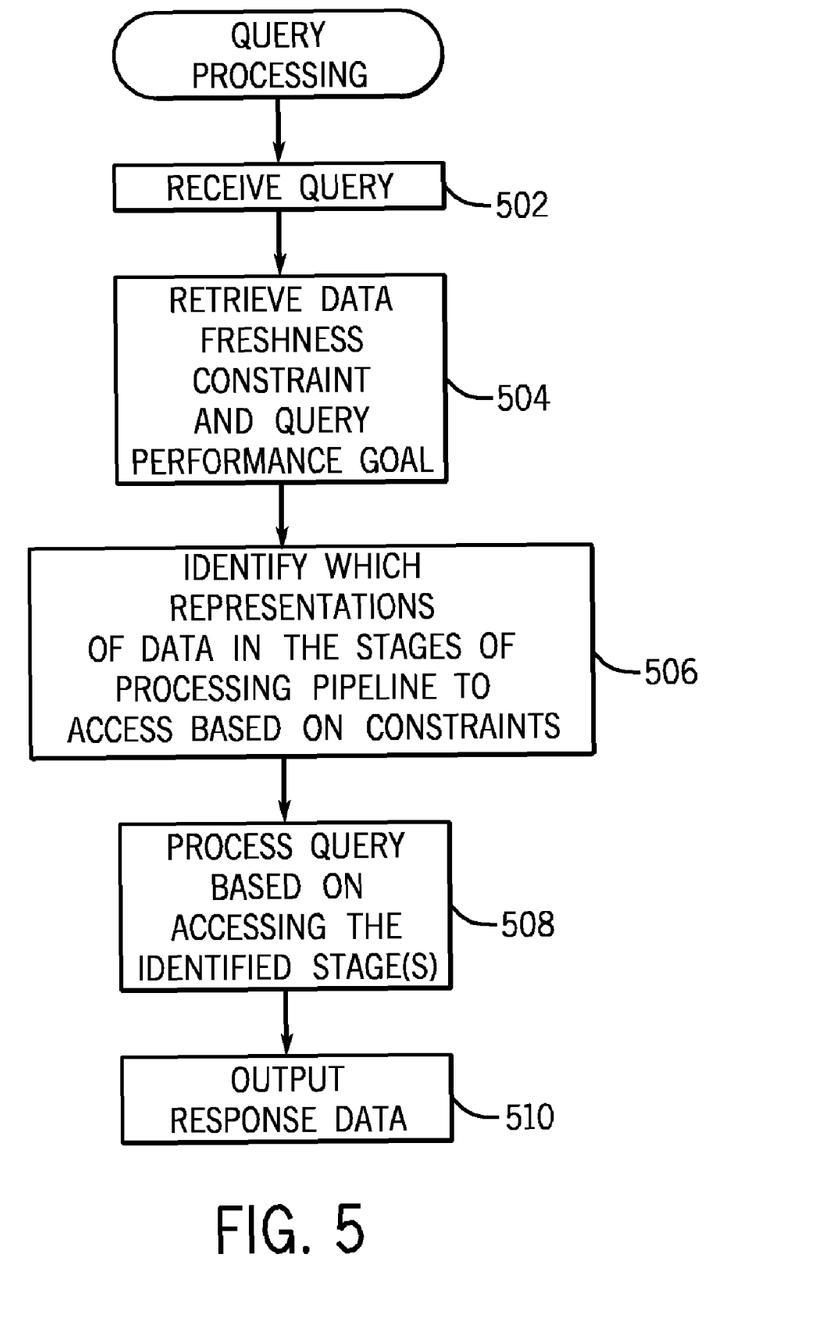
FIG. 5 is a flow diagram of a process of performing query processing, in accordance with some embodiments.

FIG. 5 illustrates a flow diagram of performing query processing of a query received from a client device 118. The server system 100 receives (at 502) the query. The server system 100 may also retrieve (at 504) a data freshness constraint and a query performance goal. The server system 100 may have kept the data freshness constraint and the query performance goal in storage of the server system 100, based on previous communication with the client device 118. Alternatively, the data freshness constraint and the query performance goal constraint can be submitted by the client device 118 along with the query received at 502.

The server system 100 then identifies (at 506) which representations of data in the processing pipeline 102 to access based on the constraints (data freshness and query performance goal). The identified representations of data can include just authority tables 114, or outputs (105, 107, 109, 111) of one or more of the ingest, ID-remapping, sorting, and merging stages.

The query is processed (at 508) based on accessing the identified stage(s) of the processing pipeline 102. The response data is then outputted (at 510) back to the client device 118.

Figure 6:
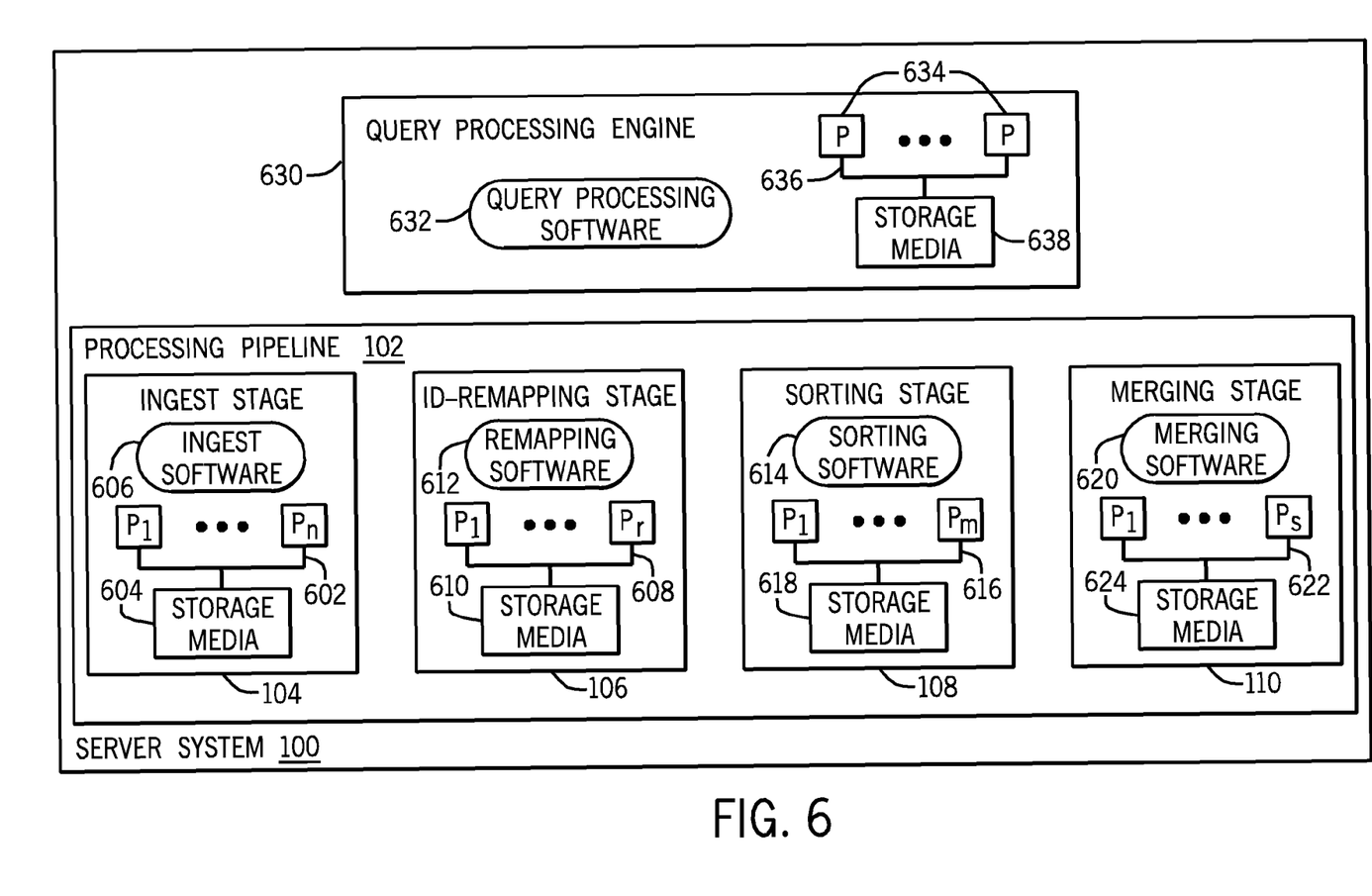
FIG. 6 is a block diagram of components of an example system, in accordance with some embodiments.

FIG. 6 depicts the server system 100 in greater detail, in accordance with a further embodiment. The components of each of the ingest stage 104, ID remapping stage 106, sorting stage 108, and merging stage 110 are depicted. The ingest stage 104 includes processors $P_1$ to $P_n$, where n represents the number of processors in the ingest stage 104. The processors $P_1$ to $P_n$ are connected by a link 602 to each other and to storage media 604, which can include volatile storage (e.g., dynamic random access memories, static random access memories, etc.) and/or persistent storage (e.g., disk-based storage). The ingest stage 104 also includes ingest software 606 executable on the processors $P_1$ to $P_n$.

The ID remapping stage 106 includes processors $P_1$ to $P_r$, where r represents the number of processors used in the ID-remapping stage 106. The processors $P_1$ to $P_r$ are connected to each other over a link 608 and to a storage media 610. Remapping software 612 in the ID-remapping stage 106 is executable on the processors $P_1$ to $P_r$.

The sorting stage 108 includes sorting software 614 executable on processors $P_1$ to $P_m$ (where m represents the number of processors in the sorting stage 108). The processors $P_1$ to $P_m$ are interconnected to each other and to a storage media 618 over a link 616.

The merging stage 110 includes merging software 620 executable on processors $P_1$ to $P_s$ (where s represents the number of processors in the merging stage 110). The processors $P_1$ to $P_s$ are interconnected to each other and to storage media 624 over a link 622.

As noted above, the number of processors in each of the processing stages 104, 106, 108, and 110 is individually and independently scalable. In other words, the numbers n, r, m, and s can be independently chosen to tune the respective performance of the corresponding stages, and to meet any cost constraints. Also, the parallelism can be set on a per-SCU basis. For example, a large SCU would be allocated more resources than a small SCU in one or more of the stages in the processing pipeline 102.

The server system also includes a query processing engine 630 to process queries received from client devices 118 (FIG. 1). The query processing engine 630 includes query processing software 632 executable on one or more processors 634. The processors 634 are interconnected to each other and to a storage media 638 over a link 636.

As noted above, a "processor" can be a CPU or a computer node. In some embodiments, each stage (104, 106, 108, or 110) and the query processing engine 630 can be made up of a single computer node or multiple computer nodes. In such embodiments, the storage media in each stage or query processing engine can be local to each computer node (e.g., a disk drive in each computer node) or be shared across multiple computer nodes (e.g., a disk array or network-attached storage system). In a specific embodiment, each of one or more of the stages 104, 106, 108, and 110 can be implemented with a set (cluster) of network-connected computer nodes, each with separate persistent storage. Each computer node in the cluster may or may not have multiple CPU's.

Instructions of software described above (including 606, 612, 614, 620, and 632) are loaded for execution on one or more processors. The processors include microprocessors, microcontrollers, processor modules or subsystems (including one or more microprocessors or microcontrollers), computer nodes, or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
   receiving, in a system having a processing pipeline with a plurality of processing stages, a data update, wherein each of the processing stages has one or plural processors, and wherein the processing stages are individually and independently scalable;
   providing, in a first of the processing stages of the processing pipeline, the date update into an update data structure, wherein the update data structure is accessible to process a query received by the system;
   transforming, by one or more additional of the processing stages, the update data structure to allow for merging of the transformed update data structure into a database, wherein the transformed update data structure is accessible to process the query; and
   storing content from the transformed update data structure into the database.

2. The method of claim 1, further comprising:
   receiving, from a first client device, a data freshness constraint requested by the first client device;
   processing, by the system, a query from the first client device according to the specified data freshness constraint,
   wherein different specified data freshness constraints cause the system to access different combinations of the processing stages to retrieve data for the query.

3. The method of claim 1, further comprising:
   receiving, from a first client device, a query performance goal requested by the first client device;
   processing, by the system, a query from the first client device according to the query performance goal,
   wherein different specified query performance goals cause the system to access different combinations of the processing stages to retrieve data for the query.

4. The method of claim 1, wherein the transforming comprises one or more of:
   remapping an identifier of the update data structure provided by the first processing stage from a first identifier space to a second identifier space;
   sorting data in the update data structure; and
   merging the sorted update data structure with another sorted update data structure.

5. The method of claim 4, wherein merging the sorted update data structure with another sorted update data structure is performed prior to storing content from the transformed update data structure into the database.

6. The method of claim 1, further comprising:
   receiving additional data updates; and
   providing the additional data updates into the update data structure,
   wherein the update data structure includes an update table, and wherein individual ones of the data updates are written into corresponding ones of rows of the update table.

7. The method of claim 6, further comprising assigning metadata to corresponding rows of the update table, wherein the metadata for each of the rows includes one or more of a timestamp indicating a time of ingesting the corresponding data update by the system, a flag indicating whether or not the corresponding row is to be deleted, and an initial identifier.

8. The method of claim 7, further comprising:
   in a second of the processing stages, remapping the initial identifier of each of the rows of the update table to a corresponding global identifier, wherein the rows of the update table are rewritten to replace the initial identifiers with corresponding global identifiers.

9. The method of claim 6, further comprising:
in a second of the processing stages, sorting content of the update table by one or more keys.

10. The method of claim 9, further comprising:
in a third of the processing stages, merging the sorted update table into the database.

11. The method of claim 10, further comprising:
in the third processing stage, applying tree-based parallelism to merge plural update tables, wherein the tree-based parallelism includes:
merging multiple update tables in different sets of the plural update tables in parallel; and
iteratively merging the merged sets until a final merged set is merged into the database.

12. The method of claim 1, further comprising:
receiving additional data updates, wherein the received data updates are collected into a batch; and
applying the batch of data updates atomically to the database.

13. The method of claim 1, further comprising:
independently selecting numbers of processors for corresponding ones of the processing stages.

14. An article comprising at least one storage medium storing instructions that upon execution by a system including processors cause the system to:
receive data updates from one or more sources;
collect, by a first stage of a processing pipeline, the data updates into a data structure;
transform, by at least a second stage of the processing pipeline, the data structure to produce a transformed data structure, wherein the first and second stages are individually and independently scalable;
store the transformed data structure into one or more data tables;
receive a query;
based on one or more constraints, access the one or more data tables and a selected one or more of the data structures provided by the first stage and the transformed data structure provided by the second stage, to retrieve data responsive to the query.

15. The article of claim 14, wherein transforming the data structure comprises:
sorting, by the second stage of the processing pipeline, content of the data structure provided by the first stage; and
merging, by a third stage of the processing pipeline, the sorted data structure with another sorted data structure.

16. The article of claim 15, wherein transforming the data structure further comprises:
changing, by a fourth stage of the processing pipeline, identifiers in the data structure provided by the second stage, wherein the fourth stage is provided between the first stage and the second stage.

17. The article of claim 16, wherein the one or more constraints are selected from among a data freshness constraint and a query performance goal.

18. A system comprising:
storage media to store one or more data tables; and
a processing pipeline having a plurality of processing stages, wherein each of the processing stages includes one or more processors, and wherein:
a first of the processing stages is configured to receive data updates from one or more sources, and to collect the received data updates into a data structure; and
at least a second of the processing stages is configured to transform the data structure to provide a transformed data structure
wherein the processing pipeline is configured to store content from the transformed data structure into the one or more data tables,
wherein the plurality of processing stages are individually and independently scalable, and
wherein content of the one or more data tables, the data structure provided by the first processing stage, and the transformed data structure provided by at least the second stage are available for access in response to queries received by the system.

19. The system of claim 18, further comprising a query processing engine to receive a query from a client device, wherein the query is associated with one or more of a data freshness constraint and a query performance goal, and wherein the query processing engine is configured to identify which of the processing stages to access to retrieve response data for the query.

20. The system of claim 18, wherein the processing pipeline further comprises a third processing stage configured to merge the transformed data structure into a particular one of the one or more data tables, wherein the particular data table is divided into plural extents, and wherein merging the transformed data structure comprises:
identifying a subset less than all of the extents of the particular data table affected by the transformed data structure; and
rewriting the identified extents into new extents of the particular data table.

* * * * *

UNITED STATES PATENT AND TRADEMARK OFFICE
CERTIFICATE OF CORRECTION

| | | |
|---|---|---|
| PATENT NO. | : 8,311,982 B2 | Page 1 of 1 |
| APPLICATION NO. | : 12/703858 | |
| DATED | : November 13, 2012 | |
| INVENTOR(S) | : Craig A. N. Soules et al. | |

It is certified that error appears in the above-identified patent and that said Letters Patent is hereby corrected as shown below:

In column 10, line 12, in Claim 1, delete "date" and insert -- data --, therefor.

Signed and Sealed this
Fifth Day of March, 2013

Teresa Stanek Rea
*Acting Director of the United States Patent and Trademark Office*